United States Patent
Ludewig et al.

(10) Patent No.: US 11,059,934 B2
(45) Date of Patent: Jul. 13, 2021

(54) PROCESS FOR PRODUCING (CYCLO)ALIPHATIC POLYCARBONATE POLYOLS HAVING LOW REACTIVITY

(71) Applicant: COVESTRO DEUTSCHLAND AG, Leverkusen (DE)

(72) Inventors: Michael Ludewig, Odenthal (DE); Stefan Sommer, Leverkusen (DE); Holger Breuer, Kaarst (DE); Michael Grahl, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 88 days.

(21) Appl. No.: 16/468,507

(22) PCT Filed: Dec. 18, 2017

(86) PCT No.: PCT/EP2017/083354
§ 371 (c)(1),
(2) Date: Jun. 11, 2019

(87) PCT Pub. No.: WO2018/114827
PCT Pub. Date: Jun. 28, 2018

(65) Prior Publication Data
US 2020/0071449 A1    Mar. 5, 2020

(30) Foreign Application Priority Data
Dec. 19, 2016  (EP) .................................... 16205050

(51) Int. Cl.
| | | |
|---|---|---|
| C08G 64/02 | (2006.01) | |
| C08G 18/44 | (2006.01) | |
| C08G 18/76 | (2006.01) | |
| C08G 64/30 | (2006.01) | |
| C08G 64/42 | (2006.01) | |

(52) U.S. Cl.
CPC ......... C08G 18/44 (2013.01); C08G 18/7671 (2013.01); C08G 64/0208 (2013.01); C08G 64/305 (2013.01); C08G 64/42 (2013.01)

(58) Field of Classification Search
CPC ... C08G 64/0208; C08G 64/305; C08G 64/42
See application file for complete search history.

(56) References Cited

U.S. PATENT DOCUMENTS

| | | | |
|---|---|---|---|
| 2,787,632 A | 4/1957 | Stevens | |
| 2,843,567 A | 7/1958 | Williams et al. | |
| 3,631,200 A | 12/1971 | Nehring et al. | |
| 4,005,121 A | 1/1977 | Senet | |
| 4,105,641 A | 8/1978 | Buysch et al. | |
| 4,533,729 A | 8/1985 | Newland et al. | |
| 4,978,691 A * | 12/1990 | Murai .................... | C08G 18/44 252/182.24 |
| 5,070,173 A | 12/1991 | Yokota et al. | |
| 5,116,929 A | 5/1992 | Greco et al. | |
| 5,143,997 A | 9/1992 | Endo et al. | |
| 5,288,839 A | 2/1994 | Greco | |
| 5,658,989 A | 8/1997 | Nakano et al. | |
| 5,703,196 A | 12/1997 | Funakoshi et al. | |
| 5,795,952 A | 8/1998 | Greco | |
| 5,929,193 A | 7/1999 | Greco | |
| 6,303,734 B1 * | 10/2001 | Funakoshi ............. | C08G 64/06 528/196 |
| 6,566,563 B1 | 5/2003 | Westfechtel et al. | |
| 7,452,525 B1 | 11/2008 | Berezkin et al. | |
| 2003/0125576 A1 | 7/2003 | Hofacker et al. | |
| 2004/0230069 A1 | 11/2004 | Hofacker | |
| 2005/0143551 A1 | 6/2005 | Tanaka et al. | |
| 2010/0292497 A1 | 11/2010 | Masubuchi et al. | |
| 2011/0077352 A1 | 3/2011 | Nakamura et al. | |
| 2012/0095141 A1* | 4/2012 | Tanabe et al. ................. | 524/126 |
| 2015/0087804 A1* | 3/2015 | Motoyoshi et al. ......... | C08G 64/0208 528/370 |

FOREIGN PATENT DOCUMENTS

| | | |
|---|---|---|
| AU | 2191370 A | 5/1972 |
| DE | 857948 A | 12/1952 |
| DE | 1495299 A | 1/1969 |
| GB | 1263225 A | 2/1972 |
| GB | 1476268 A | 6/1977 |
| JP | 2002030143 A | 1/2002 |
| JP | 2002069166 A | 3/2002 |
| WO | 9703104 | 1/1997 |

OTHER PUBLICATIONS

International Search Report—PCT/EP2017/083354 dated Feb. 22, 2018; Eigner, Markus.
Xie Xingyi, et al.; Synthesis and Characterization of Aliphatic Polycarbonate diols; Polymer Materials Science and Engineering, vol. 18, No. 4, pp. 169-172, Jul. 31, 2002.

* cited by examiner

*Primary Examiner* — Michael L Leonard
(74) *Attorney, Agent, or Firm* — John E. Mrozinski, Jr.

(57) ABSTRACT

The present invention relates to a process for producing (cyclo)aliphatic polycarbonate polyols comprising the steps of
a) reaction of at least one (cyclo)aliphatic polyol and at least one alkyl carbonate in the presence of at least one basic catalyst and
b) neutralization by addition of at least one organic sulfonic acid having a molecular weight of 250 to 1000 g/mol and at least one branched or unbranched alkyl substitution having at least four carbon atoms,
wherein step b) is performed after step a).

12 Claims, No Drawings

PROCESS FOR PRODUCING (CYCLO)ALIPHATIC POLYCARBONATE POLYOLS HAVING LOW REACTIVITY

CROSS REFERENCE TO RELATED APPLICATIONS

This application is the U.S. National Phase application under 35 U.S.C. § 371 of International Application No. PCT/EP2017/083354 filed Dec. 18, 2017, which claims priority to EP 16205050.4 filed Dec. 19, 2016, the disclosures of both applications are incorporated herein by reference.

FIELD OF THE INVENTION

The present invention relates to a process for producing (cyclo)aliphatic polycarbonate polyols and to the (cyclo) aliphatic polycarbonate polyols obtainable by this process. The present invention further relates to the use of organic sulfonic acids having a molecular weight of 250 to 1000 g/mol and at least one branched or unbranched alkyl substitution having at least four carbon atoms as a stopper in the polycarbonate polyol production. The invention also relates to an aqueous polyurethane dispersion obtainable from the cycloaliphatic polycarbonate polyol, to a two-component system or a thermoplastic polyurethane and to coatings or moulded articles obtainable therefrom.

BACKGROUND OF THE INVENTION

Oligocarbonate or polycarbonate polyols are important precursors, for example in the production of plastics, paints and adhesives. They are reacted for example with isocyanates, epoxides, (cyclic) esters, acids or acid anhydrides (DE-A 1955902, EP-A 0 343 572). They may in principle be produced from aliphatic polyols by reaction with phosgene (e.g. DE-A 1 595 446, U.S. Pat. No. 4,533,729), bis-chlorocarbonic esters (e.g. DE-A 857 948), diaryl carbonates (e.g. DE-A 1 915 908), cyclic carbonates (e.g. DE-A 2 523 352, U.S. Pat. No. 787,632, DE-A 1495299) or dialkyl carbonates (e.g. DE-A 2 555 805, EP-A 0 343 572, EP 0 533 275).

It is known that during the reaction of aryl carbonates, for example diphenyl carbonate, with aliphatic polyols, for example 1,6-hexanediol, a sufficient reaction conversion can be achieved simply by removal of the alcoholic compound liberated (e.g. phenol) to shift the equilibrium of the reaction (z. B. EP-A 0 533 275).

However, if alkyl carbonates (e.g. dimethyl carbonate) are employed, transesterification catalysts are often used. A multiplicity of different catalysts have already been proposed to this end, for example tin or organotin compounds, for example dibutyltin dilaurate or else dibutyltin oxide (DE-A 2 5233 52, EP-A 0 364 052, EP-A 0 600 417, EP-A 0 343 572, EP-A 0 302 712) or else compounds of titanium, for example titanium tetrabutoxide, titanium tetraisopropoxide or titanium dioxide (e.g. U.S. Pat. No. 2,843,567, EP-A 0 849 303, EP-A 0 343 572, EP-A 0 424 219, EP-A 0 754 714) or else organic, inorganic compounds or complexes of the rare earth metals and metals of transition group III of the periodic table (EP-A 1 312 632, EP-A 1 477 508).

However, these known prior art transesterification catalysts for producing aliphatic oligocarbonate polyols by reaction of alkyl carbonates with aliphatic polyols have a number of disadvantages.

Recently, organotin compounds have been recognized as toxicologically concerning for humans. They are therefore undesired constituents which remain in downstream products of the polycarbonate polyols when the hitherto preferred compounds such as dibutyltin oxide or dibutyltin dilaurate are employed as catalysts.

When using titanium compounds as catalysts, storage of the resulting product can result in undesired discolouration (yellowing) which is caused inter alia by the presence of Ti(III) compounds alongside simultaneously present Ti(IV) compounds and/or by the propensity for complex formation of the titanium.

While rare earth metals do not have these disadvantages, they are becoming less readily available. They are moreover less reactive and need to be added in greater quantities.

The use of alkali metals or alkaline earth metals and their oxides, alkoxides, carbonates, borates or salts of organic acids has also been described many times already (e.g. U.S. Pat. Nos. 2,210,817, 2,843,567, DE-A 2 523 352, DE-A 1 495 299, EP-A 0 849 303, EP-A 0 754 714, EP-A 0 533 275, WO 97/03104).

Nevertheless, such catalysts have not really become established to date despite their ready availability. Typical catalyst of this type, for example sodium methoxide or sodium hydroxide (NaOH), are very basic and result in an undesirably high reactivity, for example toward isocyanates, in the finished product. Even initially less basic catalysts, for example sodium hydrogencarbonate or sodium acetate, are converted via elimination of carbon dioxide or acetic acid into very basic species in the course of the reaction and result in the same disadvantages.

It has therefore previously been proposed to overcome this disadvantage of excessively high reactivity through an after treatment of the finished polycarbonate diol. Thus for instance in DE 2 555 805 the catalyst is neutralized with HCl gas and subsequently washed with water and dried. EP-A 0 533 275 also proposes neutralizing the catalyst with an equimolar amount of an acid. However, this measure generally results in the formation of a salt that is insoluble in the product which manifests as an undesired clouding of the product. The examples of this application then also include a procedure where neutralization is eschewed and the catalyst is washed out with water. While good products are surely obtained in this way on a laboratory scale, a washing-out of the catalyst with subsequent drying is far too costly and inconvenient on an industrial scale.

A further method of workup for a polycarbonate catalyzed with NaOH is filtration of the product through a column filled with bleaching earth (EP-A 0 798 327). This process too is performable on an industrial scale only at great cost and inconvenience and is at best suitable for the laboratory scale.

Neutralizing agents for alkaline catalysts well known from the prior art include phosphoric acid and its derivatives which have also previously been utilized in polycarbonate diol synthesis (JP2002 030143, JP 2002 069166 (triphosphates), WO 2000/01755 (phosphoric acid), EP-A 1 219 655 (dibutyl phosphate)). Although the recited examples do not relate to alkali metal catalysts, it is of course conceivable also to neutralize such catalysts in this way. However, it has been found that the use of phosphoric acid derivatives for strongly basic alkali metal catalysts results in only insufficient deactivation and the resulting polycarbonate diol still exhibits elevated reactivity with respect to the isocyanate reaction.

DETAILED DESCRIPTION OF THE INVENTION

The present invention accordingly has for its object the provision of a process for producing (cyclo)aliphatic polycarbonate polyols which results neither in colouring nor clouding in the product and which does not enhance the reactivity of the (cyclo)aliphatic polycarbonate polyol, in particular with respect to isocyanates.

It has now been found that the object of the invention is achieved by a process for producing (cyclo)aliphatic polycarbonate polyols comprising the steps of
  a) reaction of at least one (cyclo)aliphatic polyol and at least one alkyl carbonate in the presence of at least one basic catalyst and
  b) neutralization by addition of at least one organic sulfonic acid having a molecular weight of 250 to 1000 g/mol and at least one branched or unbranched alkyl substitution having at least four carbon atoms,
wherein step b) is performed after step a).

In the context of the present invention the neutralization in step b) is also referred to as stopping and the sulfonic acids are hereinbelow also referred to as stoppers. This inventive combination of basic catalysts and certain alkyl-substituted sulfonic acids is also referred to as a catalyst system in the context of the present invention.

In the context of the present invention the term "wherein step b) is performed after step a)" is to be understood to mean that the neutralization by the organic sulfonic acid in step b) may be effected only after the reaction in the presence of the basic catalyst in step a). However, the term shall not be understood to mean that step b) need necessarily be performed immediately after step a). Thus, any desired optional steps, for example purification steps, which are then followed by step b) may be performed after step a), wherein the neutralization of the reaction product obtained in step a) is effected substantially by the organic sulfonic acid added in step b). Substantially, it is to be understood as meaning here that the organic sulfonic acid is employed in a molar ratio of at least 0.7, preferably of at least 0.8 and particularly preferably of at least 0.9, to the basic equivalent of the catalyst.

It is preferable when the reaction in step a) is followed by a further reaction step which serves to remove terminal alkyl carbonate groups in the polymer. To this end the reaction mixture is subjected under reduced pressure to an elevated temperature of 150° C. to 250° C., preferably of 170° C. to 220° C. and particularly preferably of 180° C. to 210° C. and the alkanol formed is distilled off.

(Cyclo)aliphatic polycarbonate polyols is to be understood as meaning here that cycloaliphatic structural units and/or branched aliphatic structural units and/or unbranched aliphatic structural units are present. It is preferable when unbranched aliphatic structural units are present.

Suitable basic catalysts are for example sodium hydroxide, potassium hydroxide, sodium methoxide, potassium methoxide, sodium acetate, potassium acetate, titanium tetraisopropoxide, titanium tetrabutoxide, further titanium alkoxides, ytterbium acetylacetonate, other rare earth acetylacetonates, zinc acetylacetonate, tin acetylacetonate, sodium acetylacetonate, tin octoate, technical mixtures thereof, aluminium isopropoxide, further aluminium alkoxides, but also strong aminic bases such as 1,8-diazabicyclo[5.4.0]undec-7-ene (DBU) or 1,5-diazabicyclo[4.3.0]non-5-ene (DBN) for example.

In a first preferred embodiment the catalyst is a basic salt from the group of the alkali metals. The group of the alkaline metals is to be understood in the present application as meaning lithium, sodium, potassium, rubidium and cesium, particularly preferably lithium, sodium and potassium, very particularly preferably sodium and potassium and especially very particularly preferably sodium.

As anions of suitable basic catalysts preference is given to those which are basic or which are capable of displaying basic properties under reaction conditions. Examples include: hydroxides, oxides, carbonates, hydrogencarbonates, phosphates, silicates, alkoxides, for example methoxides, ethoxides, propoxides and salts of organic acids, for example formates, acetates, propionates. It is also conceivable to generate such salts in situ, for instance by reacting the metallic alkali metal with the corresponding alcohol or the acid.

Specific examples of particularly preferentially suitable basic catalysts are sodium hydroxide, potassium hydroxide, sodium methoxide, potassium methoxide, sodium acetate, potassium acetate. Sodium methoxide or potassium methoxide are particularly preferred.

It is also possible in accordance with the invention to use mixtures of two or more basic catalysts.

The basic catalysts used in accordance with the invention may be employed either as a solid or in solution.

The concentration of the catalysts used in accordance with the invention and/or of the mixtures is preferably between 1 ppm and 10000 ppm, preferably between 5 ppm and 500 ppm, particularly preferably between 20 ppm and 150 ppm, in each case based on the total weight of the employed (cyclo)aliphatic polyols and dialkyl carbonates.

The reaction temperature of the transesterification reaction of an organic carbonate with an aliphatic polyol with use according to the invention of the catalysts to produce aliphatic oligocarbonate polyols having a molar mass between 500 and 5000 g/mol is by preference between 40° C. and 250° C., preferably between 60° C. and 200° C. and particularly preferably between 90° C. and 170° C., especially between 110° C. and 160° C.

Alkyl carbonates which may be employed include for example dimethyl carbonate (DMC), diethyl carbonate (DEC), ethylene carbonate, propylene carbonate. It is preferable to employ the dialkyl carbonates dimethyl carbonate or diethyl carbonate. The use of dimethyl carbonate is very particularly preferred.

Employable reaction partners for the transesterification reaction of the organic carbonates to produce aliphatic oligocarbonate polyols with use according to the invention of the catalysts include (cyclo)aliphatic polyols having 2 to 25 carbon atoms (linear, cyclic, branched, unbranched, saturated or unsaturated) having an OH functionality ≥2, wherein the OH functionality may be primary, secondary or tertiary and preferably primary or secondary, wherein any desired mixtures of these OH functionalities may also be present. It is particularly preferable when the OH functionalities are primary.

Examples include: ethylene glycol, 1,2-propylene glycol, 1,3-propylene glycol, 1,3-butanediol, 1,4-butanediol, 1,5-pentanediol, 1,7-heptanediol, 1,8-octanediol, 1,9-nonanediol, 1,10-decanediol, 1,11-undecanediol, 1,12-dodecanediol, 3-methyl-1,5-pentanediol, 1,6-hexanediol, 2-ethylhexanediol, 2-methyl-1,3-propanediol, cyclohexanedimethanol, dimerdiol, diethylene glycol, dipropylene glycol, tripropylene glycol, dibutylene glycol, trimethylolpropane, pentaerythritol, hydrogenated bisphenol A, tricyclodecyldimethanol.

Also employable in accordance with the invention are polyols obtained from a ring opening reaction of a lactone with an aliphatic alcohol (linear, cyclic, branched, unbranched, saturated or unsaturated) having an OH functionality ≥2 (primary, secondary or tertiary), for example the adduct of ε-caprolactone and 1,6-hexanediol or ε-caprolactone and trimethylolpropane and mixtures thereof.

Also employable are short-chain polyethers, preferably polyethylene glycols, polypropylene glycols or else polybutylene glycols. Such short-chain polyethers have a molecular weight of not more than 800 g/mol, preferably of less than 500 g/mol. Such short-chain polyethers are preferably difunctional.

It is finally also possible to employ mixtures of different abovementioned (cyclo)aliphatic polyols as reactants.

Preference is given to aliphatic or cycloaliphatic, branched or unbranched, primary or secondary polyols having an OH functionality ≥2. Particular preference is given to aliphatic, branched or unbranched, primary polyols having a functionality ≥2. The use of 1,6-hexanediol and/or 1,5-pentanediol is very particularly preferred.

The transesterification reaction between an organic carbonate and an aliphatic polyol with use according to the invention of the catalysts may be performed either under atmospheric pressure or under reduced or elevated pressure of $10^{-3}$ to $10^3$ bar, preferably of 1 to 10 bar.

The addition of a stopper to the (cyclo)aliphatic polycarbonate polyol, preferably after removal of the terminal alkyl carbonate groups, is essential to the invention. According to the invention the stopper added is an organic sulfonic acid having a molecular weight of 250 to 1000 g/mol, preferably of 300 to 500 g/mol, and at least one branched or unbranched alkyl substitution having at least four carbon atoms. The organic sulfonic acid preferably has a molecular weight of 300 to 500 g/mol and at least one branched or unbranched alkyl substitution having at least eight carbon atoms. Examples of such organic sulfonic acids are tetrapropylenebenzenesulfonic acid or dodecylbenzenesulfonic acid or isomers thereof. It is preferable when the organic sulfonic acid is tetrapropylenebenzenesulfonic acid, dodecylbenzenesulfonic acid and/or a technical isomer mixture of dodecylbenzenesulfonic acid. Particular preference is given to dodecylbenzenesulfonic acid or the technical isomer mixture thereof.

The stopper serves to neutralize the basic catalyst and in a further preferred embodiment is employed in a molar ratio of 0.7 to 3.0, preferably of 0.8 to 1.5 and particularly preferably of 0.9 to 1.2 to the basic equivalent of the catalyst. The molar ratio of 0.9 to 1.0 is very particularly preferred since this affords a product which is neither acidic nor basic to any significant extent.

The invention further provides a (cyclo)aliphatic polycarbonate polyol produced or producible by the process according to the invention. The present invention accordingly likewise provides (cyclo)aliphatic polycarbonate polyols obtainable or obtained from (cyclo)aliphatic polyols and alkyl carbonates using basic catalysts, wherein at least one organic sulfonic acid having a molecular weight of 250 to 1000 g/mol and at least one branched or unbranched alkyl substitution having at least four carbon atoms is used as a neutralizing agent.

The (cyclo)aliphatic polycarbonate polyol according to the invention has a number-average molecular weight (Mn) of 250 g/mol to 5000 g/mol, preferably of 500 g/mol to 3000 g/mol and particularly preferably of 800 g/mol to 2500 g/mol. The number-average molecular weight is determined via the OH functionality in combination with the OH number.

The OH functionality of a (cyclo)aliphatic polycarbonate polyol according to the invention is between 1.8 and 3.0; preferably between 1.9 and 2.5 and very particularly preferably between 1.94 and 2.00. The OH functionality may be determined by $^1$H NMR spectroscopy.

The invention further provides for the use of at least one organic sulfonic acid having a molecular weight of 250 to 1000 g/mol and at least one branched or unbranched alkyl substitution having at least four carbon atoms as a stopper in polycarbonate polyol production to reduce the reactivity and/or increase the clouding stability of polycarbonate polyols.

The (cyclo)aliphatic polycarbonate polyols according to the invention are suitable for example as a building block for producing aqueous polyurethane dispersions. These polyurethane dispersions find use for example as paint raw material for paint coatings where the combination of hydrolysis resistance, chemicals resistance and high elasticity and impact resistance is particularly important. A further possible use of these polyurethane dispersions comprising the (cyclo)aliphatic polycarbonate diols according to the invention is textile coating. Here too, the combination of hydrolysis resistance, chemicals resistance and high elasticity is important.

The invention therefore further provides an aqueous polyurethane dispersion comprising at least one (cyclo)aliphatic polycarbonate polyol according to the invention reacted with at least one isocyanate-containing compound. An aqueous polyurethane dispersion according to the invention is produced in a manner known per se to those skilled in the art, for example from U.S. Pat. No. 7,452,525 B1, by reacting the polyol according to the invention with at least one isocyanate-containing compound. Hydrophilic compounds, optionally chain extenders and optionally other short- or long-chain polyols are also employed here.

The invention further provides a two-component system comprising a component A) comprising at least one (cyclo)aliphatic polycarbonate polyol according to the invention and a component B) comprising at least one polyisocyanate. The (cyclo)aliphatic polycarbonate polyols according to the invention may also be used in two-component polyurethane casting resin systems. Light resistance, yellowing resistance at high temperatures and chemicals resistance are important here.

The (cyclo)aliphatic polycarbonate polyols according to the invention may also be utilized for producing thermoplastic polyurethanes and polyesters. Such plastics are particularly impact resistant and abrasion resistant, chemicals resistant and, depending on the composition, also light resistant. The present invention therefore further provides a thermoplastic polyurethane comprising at least one (cyclo)aliphatic polycarbonate polyol according to the invention reacted with at least one isocyanate-containing compound.

The present invention further provides moulded articles or coatings, obtainable or obtained from at least one thermoplastic polyurethane according to the invention or by curing of at least one aqueous polyurethane dispersion according to the invention or by curing of at least one two-component system according to the invention.

The isocyanate-containing compounds may be any desired compounds known to those skilled in the art.

The invention is more particularly elucidated hereinbelow with reference to examples and comparative examples but without restriction thereto.

EXAMPLES

Unless otherwise stated all percentages relate to weight percent.

Determination of the NCO contents in % was undertaken by back titration with 0.1 mol/l of hydrochloric acid after reaction with butylamine based on DIN EN ISO 11909: 2007.

The OH number was determined in accordance with DIN 53240-1:2013.

Viscosity measurements of the polycarbonate polyols were performed at 23° C. with a plate-plate rotational viscometer, RotoVisko 1 from Haake, DE, at a shear rate of 47.94/s according to DIN EN ISO 3219:1990.

Example 1 (Inventive)

Production of a Polycarbonate Diol with Potassium Methoxide as Catalyst (Starting Material for Examples 2, 3, 4 and 5)

In a 15 L stainless steel reactor fitted with a stirrer, high-performance condenser and thermometer, 6643 g of 1,6-hexanediol were initially charged and dewatered for 2 hours at 120° C. under a vacuum of about 20 mbar. The batch was cooled to 80° C., vented with nitrogen and initially 7101 g of dimethyl carbonate, and then 0.8 g of potassium methoxide, were added. The pressure was then set with nitrogen to approximately 2 bar and the mixture was heated with stirring to 150° C.; this caused the pressure to increase to about 6 bar. After 24 hours the apparatus was cooled to 60° C. and the elevated pressure released. A Claisen bridge with a collection vessel was fitted and a further 0.8 g of potassium methoxide was added to the reaction mixture. The temperature was then slowly increased to 150° C. over two hours and then held for six hours at this temperature; a dimethyl carbonate/methanol mixture began to be distilled off. The temperature was then lowered to 90° C. and the pressure was slowly reduced to 15 mbar over two hours. The temperature was then slowly increased to 190° C. while maintaining the same vacuum and then held at this temperature for eight hours. After the reduction of the temperature to 80° C. the OH number of the resin was determined as 48 mg KOH/g. A further 78 g of 1,6-hexanediol were added and the mixture stirred under vacuum for a further eight hours at 190° C. A resin which was cloudy at 80° C., had an OH number of 58 mg KOH/g and was solid at room temperature was obtained.

Example 2 (Comparative)

Neutralization with Camphor-10-Sulfonic Acid of a Polycarbonate Dial Produced with Potassium Methoxide 1000 g of the polycarbonate dial from example 1 were weighed into a 2 l glass flask and heated to 100° C. 0.66 g of camphor-10-sulfonic acid were added and the mixture was stirred for about one hour. The resin remained very cloudy in the melt.

Example 3 (Comparative)

Neutralization with p-Toluenesulfonic Acid of a Polycarbonate Diol Produced with Potassium Methoxide 1000 g of the polycarbonate diol from example 1 were weighed into a 2 l glass flask and heated to 100° C. 0.54 g of p-toluenesulfonic acid were added and the mixture was stirred for about one hour. The resin remained very cloudy in the melt.

Example 4 (Comparative)

Neutralization with Dibutyl Phosphate of a Polycarbonate Diol Produced with Potassium Methoxide 1000 g of the polycarbonate dial from example 1 were weighed into a 2 l glass flask and heated to 100° C. 0.60 g of dibutyl phosphate were added and the mixture was stirred for about one hour. The resin obtained was clear in the melt.

Example 5 (Inventive)

Neutralization with Dodecylbenzenesulfonic Acid of a Polycarbonate Diol Produced with Potassium Methoxide 1000 g of the polycarbonate diol from example 1 were weighed into a 2 l glass flask and heated to 100° C. 0.93 g of dodecylbenzenesulfonic acid were added and the mixture was stirred for about one hour. The resin obtained was clear in the melt.

Example 6

Testing the Reactivity of the Neutralized Polycarbonate Dials from Examples 2, 3, 4 and 5

To test the reactivity of the polycarbonate dials these were dissolved in an 80% concentration in xylene and reacted with double the amount (in terms of NCO—OH ratio) of methylenediphenyl diisocyanate (Desmodur 2460M, Covestro AG, Leverkusen, NCO:OH=2.0) at 50° C. The reaction was performed with constant control of the viscosity in a Haake Viskotester VT550 (D=90/s). At the beginning of measurement the mixtures have a viscosity of about 660 mPas (at 50° C.).

| Example | Stopper | After 10 min | After 60 min | After 90 min |
|---|---|---|---|---|
| 2 (comp.) | camphor-sulfonic acid | 1020 mPas | 4180 mPas | 6620 mPas |
| 3 (comp.) | p-toluene-sulfonic acid | 939 mPas | 3290 mPas | 4980 mPas |
| 4 (comp.) | dibutyl phosphate | 13800 mPas | not determinable | not determinable |
| 5 (inv.) | dodecyl-benzene-sulfonic acid | 931 mPas | 2390 mPas | 3610 mPas |

It is clearly apparent that the viscosity (as an indicator of the progress of the NCO—OH reaction and thus of reactivity) increases only moderately with the three sulfonic acids from examples 2, 3 and 5 while the dibutyl phosphate in example 4 results in a markedly higher reactivity. However, the products of examples 2 and 3 are cloudy.

Example 7 (Inventive)

Production of a Polycarbonate Diol with Sodium Methoxide as Catalyst (Starting Material for Examples 8, 9, 10 and 11)

In a 15 L stainless steel reactor fitted with a stirrer, high-performance condenser and thermometer, 6643 g of 1,6-hexanediol were initially charged and dewatered for 2 hours at 120° C. under a vacuum of about 20 mbar. The batch was cooled to 80° C., vented with nitrogen and initially 6583 g of dimethyl carbonate, and then 2.67 g of sodium methoxide (as a 30% solution in methanol), were added. The mixture was subsequently heated to about 90° C. with stirring until a slight reflux was apparent in the condenser. After 24 hours the apparatus was cooled down to 60° C. and a Claisen bridge with a collection vessel was fitted. The temperature was then slowly increased to 150° C. over two hours and then held for six hours at this temperature; a dimethyl carbonate/methanol mixture began to be distilled off. The temperature was then lowered to 90° C. and the pressure was slowly reduced to 15 mbar over two hours. The temperature was then slowly increased to 190° C. while maintaining the same vacuum and then held at this temperature for eight hours. After the reduction of the temperature to 80° C. the OH number of the resin was determined as 154 mg KOH/g. A further 849 g of dimethyl carbonate were added and a high-performance condenser installed. The mixture was subsequently heated to about 90° C. with stirring until a slight reflux was apparent in the condenser. After 24 hours the apparatus was cooled down to 60° C. and a Claisen bridge with a collection vessel was fitted. The temperature was then slowly increased to 150° C. over two hours and then held for six hours at this temperature; a dimethyl carbonate/methanol mixture began to be distilled off. The temperature was then lowered to 90° C. and the pressure was slowly reduced to 15 mbar over two hours. The temperature was then slowly increased to 190° C. while maintaining the same vacuum and then held at this temperature for eight hours. After reduction of the temperature to 80° C. the OH number of the resin was this time determined as 47 mg KOH/g. 80 g of 1,6-hexanediol were then added and the mixture stirred under vacuum for a further eight hours at 190° C. A resin which was cloudy at 80° C., had an OH number of 57 mg KOH/g and was solid at room temperature was obtained.

Example 8 (Comparative)

Neutralization with Dibutyl Phosphate of a Polycarbonate Dial Produced with Sodium Methoxide 1000 g of the polycarbonate diol from example 7 were weighed into a 2l glass flask and heated to 100° C. 0.39 g of dibutyl phosphate were added and the mixture was stirred for about one hour. The resin obtained was clear in the melt.

Example 9 (Comparative)

Neutralization with Dibutyl Phosphate of a Polycarbonate Dial Produced with Sodium Methoxide 1000 g of the polycarbonate dial from example 7 were weighed into a 2l glass flask and heated to 100° C. 0.78 g of dibutyl phosphate were added and the mixture was stirred for about one hour. The resin obtained was clear in the melt.

Example 10 (Inventive)

Neutralization with Dodecylbenzenesulfonic Acid of a Polycarbonate Diol Produced with Sodium Methoxide 1000 g of the polycarbonate diol from example 7 were weighed into a 2l glass flask and heated to 100° C. 0.61 g of 4-dodecylbenzenesulfonic acid were added and the mixture was stirred for about one hour. The resin obtained was clear in the melt.

Example 11 (Inventive)

Neutralization with Dodecylbenzenesulfonic Acid of a Polycarbonate Diol Produced with Sodium Methoxide 1000 g of the polycarbonate diol from example 7 were weighed into a 2l glass flask and heated to 100° C. 0.73 g of 4-dodecylbenzenesulfonic acid were added and the mixture was stirred for about one hour. The resin obtained was clear in the melt.

Example 12

Testing the Reactivity of the Neutralized Polycarbonate Diols from Examples 8, 9, 10 and 11

To test the reactivity of the polycarbonate diols these were dissolved in an 80% concentration in xylene and reacted with double the amount (in terms of NCO—OH ratio) of methylenediphenyl diisocyanate (Desmodur 2460M, Covestro AG, Leverkusen, NCO:OH=2.0) at 50° C. The reaction was performed with constant control of the viscosity in a Haake Viskotester VT550 (D=90/s). At the beginning of measurement the mixtures have a viscosity of about 660 mPas (at 50° C.).

| Example | Stopper | After 10 min | After 60 min | After 90 min |
|---|---|---|---|---|
| 8 (comp.) | dibutyl phosphate (100%) | 3040 mPas | 10300 mPas | 12400 mPas |
| 9 (comp.) | dibutyl phosphate (200%) | 2730 mPas | 9310 mPas | 10500 mPas |
| 10 (inv.) | dodecyl-benzene-sulfonic acid (100%) | 882 mPas | 3400 mPas | 5660 mPas |
| 11 (inv.) | dodecyl-benzene-sulfonic acid (120%) | 767 mPas | 2140 mPas | 3140 mPas |

Here too it is apparent that neutralization with the sulfonic acid markedly retards the increase in viscosity and thus very markedly reduces reactivity. Even considerable overdosing of the dibutyl phosphate hardly provides a remedy. On the other hand a slight overdosing of dodecylbenzenesulfonic acid is able to further enhance the effect of reactivity reduction.

The invention claimed is:

1. A process for producing (cyclo)aliphatic polycarbonate polyols comprising the steps of
   a) reacting at least one (cyclo)aliphatic polyol and at least one alkyl carbonate in the presence of at least one basic catalyst and
   b) neutralizing by addition of at least one organic sulfonic acid having a molecular weight of 250 to 1000 g/mol and at least one branched or unbranched alkyl substitution having at least four carbon atoms,
wherein step b) is performed after step a).

2. The process according to claim 1, wherein the catalyst is a basic salt selected from the group consisting of alkali metals.

3. The process according to claim 1, wherein the catalyst is a sodium alkoxide or a potassium alkoxide.

4. The process according to claim 1, wherein that the organic sulfonic acid is selected from the group consisting of tetrapropylenebenzenesulfonic acid, dodecylbenzenesulfonic acid and a technical isomer mixture of the dodecylbenzenesulfonic acid.

5. The process according to claim 1, wherein the catalyst is employed in a concentration between 1 ppm to 10 000 ppm, based on the total weight of the employed (cyclo)aliphatic polyols and alkyl carbonates.

6. The process according to claim 1, wherein the alkyl carbonate is a dialkyl carbonate.

7. The process according to claim 1, wherein the organic sulfonic acid is employed in a molar ratio of 0.7 to 3.0, to the basic equivalent of the catalyst.

8. The process according to claim 1, wherein the (cyclo) aliphatic polyol is selected from the group consisting of 1,5-pentanediol and 1,6-hexanediol and mixtures thereof.

9. A method of reducing reactivity of polycarbonate polyols in polycarbonate polyol production, the method comprising including at least one organic sulfonic acid having a molecular weight of 250 to 1000 g/mol and at least one branched or unbranched alkyl substitution having at least four carbon atoms as a stopper.

10. The process according to claim 1, wherein the catalyst is employed in a concentration between 5 ppm and 500 ppm based on the total weight of the employed (cyclo)aliphatic polyols and alkyl carbonates.

11. The process according to claim 1, wherein the catalyst is employed in a concentration between 20 ppm and 150 ppm based on the total weight of the employed (cyclo) aliphatic polyols and alkyl carbonates.

12. A method of increasing clouding stability of polycarbonate polyols in polycarbonate polyol production, the method comprising including at least one organic sulfonic acid having a molecular weight of 250 to 1000 g/mol and at least one branched or unbranched alkyl substitution having at least four carbon atoms as a stopper.

* * * * *